US007012055B2

(12) United States Patent
Findlay et al.

(10) Patent No.: US 7,012,055 B2
(45) Date of Patent: *Mar. 14, 2006

(54) FABRIC TREATMENT COMPOSITIONS COMPRISING ORGANICALLY MODIFIED PARTICLES

(75) Inventors: Paul Hugh Findlay, Wirral (GB); Joseph Edward Hunter, Liverpool (GB); Laxmikant Tiwari, Wirral (GB); Nicola Whilton, Wirral (GB)

(73) Assignee: Unilever Home & Personal Care USA, division of Conopco, Inc., Greenwich, CT (US)

( * ) Notice: Subject to any disclaimer, the term of this patent is extended or adjusted under 35 U.S.C. 154(b) by 498 days.

This patent is subject to a terminal disclaimer.

(21) Appl. No.: 10/406,952

(22) Filed: Apr. 4, 2003

(65) Prior Publication Data

US 2004/0127392 A1 Jul. 1, 2004

(30) Foreign Application Priority Data

Apr. 4, 2002 (GB) .................................. 0207850

(51) Int. Cl.
*C11D 3/08* (2006.01)
(52) U.S. Cl. ...................... 510/334; 510/276; 510/287; 510/334; 510/418; 510/460; 510/507; 510/511
(58) Field of Classification Search ................ 510/276, 510/287, 334, 418, 460, 507, 511
See application file for complete search history.

(56) References Cited

U.S. PATENT DOCUMENTS

| 3,892,681 | A | | 7/1975 | Edwards et al. |
| 3,936,537 | A | | 2/1976 | Baskerville, Jr. et al. |
| 3,948,790 | A | * | 4/1976 | Speakman .................. 510/330 |
| 4,051,046 | A | | 9/1977 | Diehl et al. |
| 4,062,647 | A | | 12/1977 | Storm et al. |
| 4,260,498 | A | | 4/1981 | Sample, Jr. et al. |
| 4,287,086 | A | | 9/1981 | Finlayson et al. |
| 4,557,854 | A | | 12/1985 | Plueddeman |
| 4,742,039 | A | * | 5/1988 | Hanauer et al. ............. 502/407 |
| 4,828,723 | A | | 5/1989 | Cao et al. |
| 4,844,821 | A | * | 7/1989 | Mermelstein et al. ....... 510/328 |
| 5,336,647 | A | | 8/1994 | Nae et al. |
| 5,429,999 | A | | 7/1995 | Nae et al. |
| 5,443,750 | A | | 8/1995 | Convents et al. |
| 5,527,871 | A | | 6/1996 | Tani et al. |
| 5,756,628 | A | | 5/1998 | Tani et al. |

FOREIGN PATENT DOCUMENTS

| EP | 0 112 580 | 7/1984 |
| EP | 0 381 487 | 8/1990 |
| EP | 0 899 308 | 3/1999 |
| EP | 1 026 203 | 8/2000 |
| GB | 1 400 898 | 7/1975 |
| GB | 1 428 061 | 3/1976 |
| JP | 00128521 | 5/2000 |
| WO | 02/46345 | 6/2002 |

OTHER PUBLICATIONS

UK Search Report GB 0207850.9 dated Oct. 24, 2002—2 pp.
EPO patents abstracts of Japan—abstracts of JP 2000128521 A.
Whilton, et al. "*Hybrid Lamellar Nanocomposites Based on Organically Functionalized Magnesium Phyllosilicate Clays with Interlayer Reactivity*", Journal of Material Chemistry vol. 8(8), pp. 1927-1932 (1998).
U.S. Appl. No. 10/005,240, filed Dec. 5, 2001, Whilton et al., For: Fabric Treatment Compositions.
Int'l. Search Report No. PCT/EP 03/03031 dated Jul. 23, 2003—3 pp.
Ukrainczyk, L. et al., Template Synthesis and Characterization of Layered Al- and Mg- silsesqiuoxanes: *J. Phys. Chem.* vol. 101, 531-539 (1997). —XP-001118487.
Cao, G. et al., "Layered Metal Phosphates and Phosphonates: From Crystals to Monolayers", *Acc. Chem. Res.*, vol. 25, 420-427 (1992)—XP-002165900.
Katz, H.E., "Multilayer Deposition of Novel Organophosphonates with Zir(IV)", *Chem. Mater.*, vol. 6, No. 12, 2227-2232, (1994)—XP-001118495.
EPO Patent Abstracts of Japan, abstract of JP 09 301713, Nov. 25, 1997, (Kanegafuchi Chem. Ind. Co., Ltd.).
EPO Patent Abstracts of Japan, abstract of JP 61 212321, Sep. 20, 1986, (Shiseido Co., Ltd.).

* cited by examiner

Primary Examiner—Charles Boyer
(74) Attorney, Agent, or Firm—Alan A. Bornstein

(57) ABSTRACT

Fabric treatment compositions comprising a textile compatible carrier and particles having a layered structure comprising oxygen atoms and silicon and/or phosphorus atoms and comprising organic functional groups which are bonded to silicon and/or phosphorus atoms by direct covalent bonds between the silicon and/or phosphorus atoms and a carbon atom.

The functional groups are selected to impart lubricating properties to the particles.

24 Claims, No Drawings

FABRIC TREATMENT COMPOSITIONS COMPRISING ORGANICALLY MODIFIED PARTICLES

TECHNICAL FIELD

This invention relates to fabric treatment compositions, to their use in the treatment of fabric and to a method of treating fabric with the compositions.

BACKGROUND AND PRIOR ART

It is known that the physical properties of fabrics can be modified by certain treatments. For example, fabric may be treated in order to modify its physical properties either in an industrial pretreatment or during laundering.

Fabrics in general, and cotton in particular, are prone to the formation of creases before, during and after laundering and drying. In order to remove such creases from the fabric, a considerable amount of time and effort must be spent ironing upon each occasion of laundering and drying. The terms "crease" and "wrinkle" and related terms, such as "anti-crease" and "anti-wrinkle", refer to non-permanent deformations in the fabric which can be removed by flattening at elevated temperature and moisture (eg, by ironing) and are used synonymously herein.

Some of the previous attempts to address the problems of crease formation with regard to fabrics have been based on the use of insoluble particulate materials.

U.S. Pat. No. 3,892,681, for example, discloses the use of granular, substantially water-insoluble starch particles having a diameter between 1 to 45 $\mu$m in detergent compositions. Such particles are said to impart anti-wrinkling and ease of ironing benefits in addition to other fabric conditioning properties.

A detergent composition featuring a substantially water-insoluble particulate material with a diameter from about 5 to 30 $\mu$m is described in U.S. Pat. No. 4,051,046. The particulate material may be a glass, ceramic or polymer-based bead, or a starch that has been treated with a hydrophobic agent to reduce its water solubility. In order to permit ironing, the particles must have a melting point above 150° C. These compositions are said to confer a range of fabric benefits, including anti-wrinkling and ease of ironing.

The use of smectite clay as a softening agent is disclosed in U.S. Pat. No. 3,936,537. In this document, the clay is combined with a quaternary ammonium salt, which confers anti-static benefits, and a dispersion inhibitor consisting of a solid organic material, in a detergent compatible composition.

Smectite clay is also used in the fabric-softening detergent compositions disclosed in U.S. Pat. No. 4,062,647. Again the clay is said to impart improved softening and/or anti-static characteristics.

A fabric softening detergent composition comprising a synthetic non-soap detergent, builder salt and clay is disclosed in GB 1400898. The clay, added for softening benefits, is a three-layer smectite-type clay with an ion exchange capacity of at least 50 meq/100 g. The combination of builder salt and clay is described as helping prevent agglomeration of the clay, thus allowing efficient deposition of the clay on fabric. In GB 1428061, a similar fabric softening composition is disclosed with a water-insoluble quaternary ammonium salt present as an anti-static agent. The smectite-type clay, responsible for imparting softness benefits, has a particle size below 50 microns and an ion-exchange capacity of at least 50 meq/100 grams.

In U.S. Pat. No. 5,443,750, clay, which may be smectite clay, is used 10 in conjunction with an enzyme in a detergent composition to afford increased softening properties.

EP-A-0 381 487 describes the use of liquid detergent compositions in which a clay (an aluminosilicate eg, smectite) is treated with a barrier material, selected from a siloxane, a polysiloxane, a polyacrylate, dialkyl citrate, alkoxylated dialkyl citrate, alkoxylated glycerol mono- and di-stearates, and alkoxylated N-alkyl alkanolamides, prior to incorporation of the clay into the formulation The treatment of a range of water insoluble materials, including clay, with an organosilicon compound bearing a quaternary ammonium group is taught in U.S. Pat. No. 4,557,854. The organosilicon groups are grafted onto the surface of the clay particles and, therefore, will be bound to the silicon atoms in the layers of the clay by way of Si—O linkages. The effect of the treatment is described as being to increase the cleaning power of conventional organic surface-active agents.

The treatment of cotton fabrics with cross-linking agents, such as butane-1,2,3,4-tetracarboxylic acid (BTCA), is known to impart anti-wrinkle properties. However, such treatments tend to make the fabric stiff and relatively easy to tear.

U.S. Pat. No. 4,844,821 discloses liquid laundry detergent and liquid fabric softener compositions containing a smectite-type clay fabric softener in combination with an anti-settling agent and, optionally, a softness enhancing amount of a polymeric clay-flocculating agent.

U.S. Pat. No. 3,948,790 discloses detergent compositions containing a quaternary ammonium clay. The clay is an impalpable smectite clay in which from 5 to 100 molar percent of the exchangeable cations are alkyl-substituted ammonium ions.

U.S. Pat. No. 4,828,723 discloses non-aqueous heavy duty laundry detergent composition in the form of a suspension of a builder salt in liquid nonionic surfactant which is stabilised against phase separation by the addition of a low density filler and a small amount of organophilic modified clay such as a water-swellable smectite clay in which the metal cations are fully or partially exchanged with mono- or di-long chain quaternary ammonium compounds.

U.S. Pat. No. 5,336,647 discloses organophilic clay complexes which are dispersible in non-aqueous fluids to form a gel therein. The organophilic clay complex comprises the reaction product of:
(a) a smectite-type clay;
(b) a first organic cation an amount of from about 75% to about 150% of the cation exchange capacity of the smectite-type clay; and
(c) a second organic cation provided by a polyalkoxylated quaternary ammonium salt; wherein the second organic cation is present in an amount of from about 0.01% to about 20% by weight of the total organic cation content.

U.S. Pat. No. 5,527,871 discloses a layered inorganic-organic polymer which has its inorganic portion in the form of a layered clay-like structure composed of one or two sheets of tetrahedrons (whose central atom is Si or a metal) and a sheet of octahedrons (whose central atom is a metal). The central atoms of the tetrahedrons are partially or entirely bonded to organic groups. The organic groups may contain functional groups e.g. the functional groups may participate in a polymerisation reaction.

U.S. Pat. No. 4,287,086 discloses organophilic organic-clay complexes which are dispersible in organic liquids to form a gel. The gels may be useful as lubricating greases, oil base muds, oil base packer fluids, paint-varnish-lacquer removers, paints and foundry moulding sand binders. The organophilic clay is the reaction product of a smectite clay and a methyl benzyl dialkyl ammonium salt.

U.S. Pat. No. 542,999 discloses an organophilic clay gellant useful in a non-aqueous fluid system such as paints, inks and coatings. The organophilic clay gellant comprises the reaction product of:
(a) a smectite clay having a cation exchange capacity of at least 75 milliequivalents per 100 grams of natural clay without impurities;
(b) a first organic cation in an amount of from about 75% to about 150% of the cation exchange capacity of the smectite clay;
(c) a second organic cation provided by a polyalkoxylated quaternary ammonium salt: and
(d) one or more organic anions(s) that is capable of reacting with said first and second organic cations, to form an organic cation-organic anion complex with said smectite clay.

Co-pending PCT/EP01/12580 discloses fabric treatment composition comprising a textile compatible carrier and water insoluble particles having a layered structure comprising oxygen atoms and silicon and/or phosphorus atoms, and comprising organic functional groups which are bonded to silicon and/or phosphorus atoms in the layers by direct covalent bonds between the silicon and/or phosphorus atoms and a carbon atom.

In a preferred embodiment the use of fabric compositions comprising water-insoluble particles having a layered structure and comprising one or more organic functional groups which are capable of self cross-linking and/or reacting with the fibres of the fabric leads to improved anti-wrinkle, ie, crease reduction, performance of fabrics, without the disadvantages of conventional cross-linking agents such as butane-1,2,3,4-tetracarboxylic acid (BTCA). Hence, fabrics treated with compositions comprising such water-insoluble particles have good antiwrinkle properties but are less stiff, less prone to discolouring and less susceptible to tearing than fabrics treated with some conventional cross-linking agents.

Cellulosic fibres possess hydroxyl groups; proteins possess a range of functional groups. Preferably, the organic functional groups comprise electrophilic groups which are capable of reacting with hydroxyl groups for reaction with, for example, cellulosic fibres or proteinaceous fibres and/or thiol groups for more specific reaction, for example, with proteinaceous fibres. Suitable examples of electrophilic groups include: acid anhydrides, epoxides, acid chlorides, isocyanates, azetidinium-containing groups, carboxylic acids, vinyl sulfones, aldehydes, ketones, enol esters, aziridines, azalactones and mixtures thereof. The epoxide group is especially preferred.

It has now been found that a particular range of functional groups will provide particles capable of delivering enhanced lubricating properties to a fabric compared to particles without the functional groups.

According to one aspect of the present invention there is provided fabric treatment composition comprising a textile compatible carrier and particles having a layered structure comprising oxygen atoms and silicon and/or phosphorus atoms, and comprising organic functional groups which are bonded to silicon and/or phosphorus atoms in the layers by direct covalent bonds between the silicon and/or phosphorus atoms and a carbon atom, characterised in that the functional groups are selected from:

(i) a group of the formula:

in which;

Y comprises a chain of at least 6 carbon atoms optionally interrupted by one or more heteroatoms selected from N, O and S providing there are at least 3, preferably at least 4 carbon atoms for each heteroatom in the chain, Y being linked to said silicon or phosphorous atom through a carbon atom, and T represents H or a terminal groups which is not capable of self-cross-linking and/or forming covalent bonds to cellulosic and/or proteinaceous fibres during domestic washing and rinsing cycles;

(ii) a group of the formula:

in which:

$R^1$ represents an alkylene group of at least 4 carbon atoms, each $R^2$ is independently lower alkyl and $-NR^2R^2$ is preferably, but need not be, a terminal group;

(iii) a group of the formula:

in which:

$R^3$ represents an alkylene group of at least 3 carbon atoms, each $R^4$ is independently selected from alkyl groups of from 1 to 25 carbon atoms provided at least one $R^4$ is lower alkyl of 1 to 16 carbon atoms, (iv) a group of the formula

in which each $R_{1a}$ group is independently selected from $C_{1-4}$ alkyl or hydroxyalkyl groups or $C_{2-4}$ alkenyl groups;

each $R_{2a}$ group is independently selected from $C_{8-28}$ alkyl or alkenyl groups;

$R_{3a}$ is a linear or branched alkylene group of 1 to 5 carbon atoms,

X is

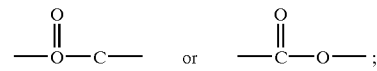

and p is 0 or is an integer from 1 to 5, with the proviso that one of $R_{1a}$ and $R_{2a}$ is an alkylene group of at least 3 carbon atoms attached to said silicon or phosphorus atom;

(v) a group of the formula:

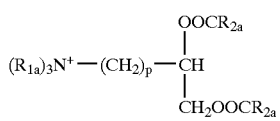

in which $R_{1a}$, p and $R_{2a}$ are as defined above;

(vi) a group of the formula:

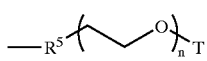

in which:
T is as defined above,
$R^5$ represents a group of at least one carbon atom, preferably at least 3 carbon atoms, which may be interrupted by one or more heteroatoms selected from N, O and S providing there are at least 3 carbon atoms for each heteroatom,
n is an integer of at least 6; and (vii) a group of the formula:

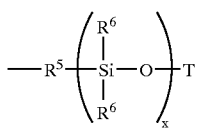

in which:
T and $R^5$ are as defined above,
each $R^6$ independently represents an alkyl group, a fluorinated alkyl group, an amino substituted alkyl group, an alkyl group substituted with a sugar moiety, or a sidechain comprising an ethoxylated and/or propoxylated chain, and
x is an integer of at least 5.

The organic functional groups are selected to delivery enhanced lubricating properties compared to corresponding materials which do not possess the functional groups. When applied to fabrics the materials provide a lubricating effect reducing the inter-yarn friction at the yarn/yarn contacts. The effect of the materials can be assessed by Kawabata shear as discussed hereinafter. The enhanced lubricating properties may provide improved softness, ease of ironing, anti-wrinkle, anti-abrasion and related benefits.

The materials may be used to treat fabric by simply bringing them in contact with the fabric. The materials are water dispersible and may be delivered to the fabric in the main wash or in the rinse conditioner. The lubrication performance delivered by these materials can exceed the lubrication performance delivered by conventional rinse conditioner cationic surfactant systems.

The desired functional groups may be introduced during the synthesis of the materials, through post-modification of pre-synthesised functional materials or modification of an existing clay.

The present invention involves the use of particles having a layered structure comprising oxygen atoms and silicon and/or phosphorus atoms, and comprising organic functional groups which are bonded to silicon and/or phosphorus atoms in the layers by direct covalent bonds between the silicon and/or phosphorus atoms and a carbon atom. The particles tend to be water-insoluble. The particles are dispersible in water at 20° C. and in some cases will appear to give solutions as they may break down into submicron fragments.

The particles used in the invention are of a size such that they are not perceived as distinct particles to the touch. Preferably, the particles used in the invention have an average size of from 0.01 to 100 $\mu$m. More preferably, the particles used herein have an average size in the range of from about 1 $\mu$m to 50 $\mu$m. The size of the particles refers to their maximum dimension, such as their diameter when the particles are substantially spherical.

The layered nature of the particles preferably involves an ordered array comprising oxygen atoms and silicon and/or phosphorus atoms. The layers may also comprise other metallic and/or non-metallic atoms. Other atoms which may be present in the layers include, for example, di- and/or tri-valent metal atoms, such as of alkaline earth metals (eg, magnesium or calcium), of transition metals (eg, copper, nickel and/or zirconium), of Group IIIB of the periodic table (eg, aluminum) or of mixtures thereof. Suitable particles may comprise discrete, repeating units of layers or sheets. Layers or sheets are substantially two-dimensional arrays of atoms. Preferably, the repeating unit consists of a plurality of (eg, two or three) layers, or sheets, of atoms with a metallic atom or a mixture of metallic atoms forming the central layer and a range of non-metallic atoms bridging and/or forming the surrounding layers. Also present within the repeating unit may be a variety of atomic, ionic or molecular species, including for example, polyvalent metal ions such as sodium and/or calcium and/or hydroxonium ions.

Suitable examples of layered structures include those comprising divalent or trivalent metal ions, or a mixture thereof, in the central layer. Preferably, the central layer comprises magnesium, nickel or aluminium ions, or mixtures thereof, which are connected via oxygen atoms and/or hydroxyl groups to the surrounding layer. Preferably, the surrounding layers comprise a mixture of silicon atoms and oxygen atoms as well as other cationic and/or molecular species.

The interlayer spacing in the particles which are used in the invention is preferably greater than 10×, more preferably greater than 12×, as determined by X-ray crystallography. The interlayer spacing preferably does not exceed about 100× and, more preferably, it does not exceed about 50×.

When the central layer comprises divalent ions and the outer layer comprises silicon atoms, with bridging oxygen atoms and hydroxyl groups, the layered structure is analogous to that of talc-like smectite, or phyllosilicate clays.

Smectite clays can broadly be differentiated on the basis of the number of octahedral metal-oxygen arrangements in the central layer for a given number of silicon-oxygen atoms in the outer layer. Those clays featuring primarily divalent metal ions comprise the prototype talc and the members hectorite, saponite, sauconite and vermiculite. When the clays feature primarily trivalent metal ions the structures change and now comprise the prototype pyrophillite, montmorillonite, nontronite and volchonskoite.

The particles comprise one or more organic functional groups. The functional groups in each particle may be a single type of functional group or a mixture of different types of functional groups. These organic functional groups can be at least partly responsible for conferring the desired properties on the fabric, after treatment with the particles or compositions comprising the particles.

The functional groups of formula (I) are preferably long chain alkyl or alkylene groups preferably having at least 6, or preferably from 8 to 20 carbon atoms. Alkyl groups are preferred.

The terminal group T may be hydrogen or any group which is not capable of self-cross-linking and/or forming covalent bonds to cellulose and/or proteinaceous fibres during domestic washing and rinsing cycles. For enhanced lubrication, there should be no stiffening of the fabric by the materials crosslinking or bonding to the fibres. In general, if a terminal group is present, it is selected to improve the dispersibility of the material. Suitable groups include alkyl, ether, carboxylic acid, sulphonate, sulphate, phosphate and phosphinate groups.

In the groups of formula (II), the amine group is linked via $R^1$ which is an alkylene group of at least 4 carbon atoms. At least 1, preferably both, of the $R^2$ groups is an alkyl group of at least 8 carbon atoms.

The quaternary group of formula (III) is linked via $R^3$ which represents an alkylene group of at least 3 carbon atoms. $R^3$ may have a long chain e.g. up to 20 carbon atoms.

Generally, 1 or 2 of the $R^4$ groups is lower alkyl e.g. methyl and the other has a longer chain length e.g. up to 20 carbon atoms. In one embodiment, two of the $R^4$ groups are long chain alkyl groups.

The groups of formula (IV) and (V) are based upon the structure of known cationic fabric softening compounds. It is possible to introduce these groups into the material of the particles either during synthesis of the material or through post-modification of a pre-synthesised functional clay.

Similarly, it is possible to introduce a polyethylene glycol chain as a functional group as represented by formula (VI) and a silicone chain as represented by formula (VII). The silicone backbone may have side chains in a similar manner to known silicone polymers. Suitable side chains include alkyl groups, perfluro side chains, side chains having amino functionality, side chains having sugar moieties and epoxylated and/or propoxylated side chains.

The materials may comprise a mixture of two or more functional groups.

Materials having octyl and dodecyl groups are disclosed in Ukrainczyk, R. A. Bellman, A. B. Anderson, J. Phys. Chem. B., 1997, 101, 531–539.

Compounds having the functional groups of formula (II) to (VII) are believed to be new and form a further aspect of the invention.

The particles are preferably of a clay functionalised by the introduction-of organic functional groups during its synthesis. The organic functional groups may be converted to different organic functional groups by reaction of the clay, after it has been synthesised, with an appropriate reagent, to form another clay which is suitable for use in the present invention. Appropriate reagents and reaction conditions for the interconversion of functional groups are well-known to those skilled in the art. Alternatively, the clay may need no conversion of functional groups prior to use in the compositions of the invention.

More preferably, the functionalised particles are of the general class of inorganic-organic hybrid clays known as an organo(phyllosilicates). Examples of synthetic methods for forming organo(phyllosilicates), or organoclays, are described in *J. Mater. Chem.*, vol. 8, 1998, p 1927–1932, *J. Phys. Chem. B.* 1997, 101, 531–539, *J. Chem. Soc., Chem. Commun.*, 1995, 241–242 and *J. Mater. Chem.* 2000, 10, 1457–1463. In these examples, the organic functionality is introduced into the clay by assembling a metal oxide/hydroxide framework in the presence of an organotrialkoxysilane. The particles of the present invention are preferably produced according to this method. Therefore, the particles are preferably obtainable by the hydrolysis of an organotrialkoxysilane in the presence of at least one di- or tri-valent metal ion in an alcoholic solution at a suitable pH appropriate to the metal ion used. The skilled person is readily able to determine a suitable pH for the hydrolysis on the basis of the teaching of the prior art. For example, for magnesium, the pH is typically greater than 7 and for aluminium it will typically be in the range of from pH 5–12 (preferably from 5.5 to 6.5).

Other functionalised particles are also suitable for use in the present invention. For example, metal organophosphates (including zirconium (which is preferred), titanium, hafnium, vanadium (V), magnesium (II), manganese (II), calcium (II), cadmium (II), lanthanum (III), samarium (III), cerium (III) and iron (III)) can be prepared by a precipitation reaction involving mixing a solution of the metal ion and a solution of an organic phosphoric or phosphinic acid. Crystallisation of the layered structure results. Synthetic routes of this type are described, for example, in *Acc. Chem. Res.*, 1992, 25, 420–427, *Chem. Mater.* 1994, 6, 2227, *Acc. Chem. Res.*, 1978, 11, 163 and *Chem. Rev.*, 1988, 88, 55. Zirconium organophosphates, and other metal organophosphates, typically comprise, in each layer, a plane of metal atoms linked together by phosphonate groups. The metal atoms are preferably octahedrally coordinated by oxygen atoms, with the three oxygen atoms of each phosphonate tetrahedron bound to three different metal atoms.

The preferred particles used in the invention are organoclays and more preferably three-layer clays consisting of a central metal-containing layer, as in the analogous talc-like structures, together with bridging oxygen and hydroxyl groups and silicon atoms in the outer two layers. Unlike talc, however, the outer silicon atoms are attached to organic groups as well as oxygen atoms. Preferably, a high proportion (for example greater than 50% by number, more preferably greater than 75% by number) of the Si atoms in any given organoclay particle are covalently bonded to at least one carbon atom. However, the layered structure may contain varying amounts of Si atoms that are not covalently bonded to a carbon atom, and these particles will also operate effectively within the scope of the invention.

The organoclays preferably comprise silicon or phosphorus, oxygen, metal (eg, magnesium, nickel, zirconium or aluminium or mixtures thereof) and, optionally, hydrogen atoms, in addition to the organic functional groups and the organic functional groups in the water insoluble particles.

Preferred particles of the invention may have the general formula (without the functional groups)

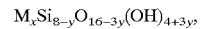

wherein:
M is Mg, Ni, Cu or Al
x is 6 when M is Mg, Ni or Cu; and 4 when M is Al
y is between 0 and 4

In a particularly preferred example of the invention, the organoclay may be represented by the formula $Mg_6Si_8R_8O_{16}(OH)_4$, with a silicon to magnesium ratio of 1.33 and where R is any one of the suitable organic functional groups listed above. Again, the particles are conveniently functionalised by virtue of a direct Si—C covalent bond created during the synthesis of the whole material, not by synthetic post-modification (eg, by grafting onto the surface of a preformed clay particle); this allows far more organic functional groups to be incorporated at the surface of, and/or within the layers of, the particle.

Treatment of fabric with the fabric treatment compositions of the invention comprises any step in which the compositions are applied to fabric.

Typically, application occurs with the composition in the form of an aqueous dispersion or suspension. Treatments include laundering of the fabric.

The fabric preferably comprises synthetic or non-synthetic fibres or mixtures thereof. Non-synthetic fibres include, for example, cellulosic (eg, cotton) or proteinaceous (eg, wool or silk) fibres. Synthetic fibres include, for example, nylons and polyesters.

The invention may also be carried out in non-domestic environments. For example, the method of the invention may involve the treatment of fabric (before or after it has been made into finished articles such as garments) on an industrial scale.

The particles having a layered structure and comprising one or more organic functional groups are preferably present in the fabric treatment composition in an amount of from 0.01% to 50% by weight of the composition; more preferably they are present in an amount of from 0.1% to 20% by weight of the composition, most preferably 0.1–10% by weight of the composition. However, the particles may be supplied as concentrates e.g. for adding to a treatment liquor, in which case the particles may be present in concentrations up to 100%.

The fabric treatment composition contains one or more textile compatible carriers.

The nature of the textile compatible carrier will be dictated to a large extent by the stage at which the composition of the invention is used in a laundering process, the compositions being capable of being used, in principle, at any stage of the process. For example, where the compositions are for use as main wash detergent compositions, which is preferred, the one or more textile compatible carriers comprise a detergent active compound. Where the compositions are for use in the rinsing step of a laundering process, the one or more textile compatible carriers may comprise a fabric softening and/or conditioning compound.

The compositions of the invention preferably comprise a perfume, such as of the type which is conventionally used in fabric care compositions. The compositions may be in the form of packaged articles which are labelled as being for use in a domestic laundering process.

The textile compatible carrier is a component which can assist in the interaction of the first component with the fabric. The carrier can also provide benefits in addition to those provided by the first component e.g. softening, cleaning etc.

If the composition of the invention is to be used before, or after, the laundry process it may be in the form of a spray or foaming product.

The laundering processes of the present invention include the large scale and small scale (eg domestic) cleaning of fabrics. Suitable fabrics include fabrics which are in the form of garments. Preferably, the processes are domestic Detergent Active Compounds If the composition of the present invention is in the form of a detergent composition, the textile-compatible carrier may be chosen from soap and non-soap anionic, cationic, nonionic, amphoteric and zwitterionic detergent active compounds, and mixtures thereof.

Many suitable detergent active compounds are available and are fully described in the literature, for example, in "Surface-Active Agents and Detergents", Volumes I and II, by Schwartz, Perry and Berch.

The preferred textile-compatible carriers that can be used are soaps and synthetic non-soap anionic and nonionic compounds.

Anionic surfactants are well-known to those skilled in the art. Examples include alkylbenzene sulphonates, particularly linear alkylbenzene sulphonates having an alkyl chain length of $C_8$–$C_{15}$; primary and secondary alkylsulphates, particularly $C_8$–$C_{15}$ primary alkyl sulphates; alkyl ether sulphates; olefin sulphonates; alkyl xylene sulphonates; dialkyl sulphosuccinates; and fatty acid ester sulphonates. Sodium salts are generally preferred.

Nonionic surfactants that may be used include the primary and secondary alcohol ethoxylates, especially the $C_8$–$C_{20}$ aliphatic alcohols ethoxylated with an average of from 1 to 20 moles of ethylene oxide per mole of alcohol, and more especially the $C_{10}$–$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

Cationic surfactants that may be used include quaternary ammonium salts of the general formula $R_1R_2R_3R_4N^+X^-$ wherein the R groups are independently hydrocarbyl chains of $C_1$–$C_{22}$ length, typically alkyl, hydroxyalkyl or ethoxylated alkyl groups, and X is a solubilising cation (for example, compounds in which $R_1$ is a $C_8$–$C_{22}$ alkyl group, preferably a $C_8$–$C_{10}$ or $C_{12}$–$C_{14}$ alkyl group, $R_2$ is a methyl group, and $R_3$ and $R_4$, which may be the same or different, are methyl or hydroxyethyl groups); and cationic esters (for example, choline esters) and pyridinium salts.

The total quantity of detergent surfactant in the composition is suitably from 0.1 to 60 wt % e.g. 0.5–55 wt %, such as 5–50 wt %.

Preferably, the quantity of anionic surfactant (when present) is in the range of from 1 to 50% by weight of the total composition. More preferably, the quantity of anionic surfactant is in the range of from 3 to 35% by weight, e.g. 5 to 30% by weight.

Preferably, the quantity of nonionic surfactant when present is in the range of from 2 to 25% by weight, more preferably from 5 to 20% by weight.

Amphoteric surfactants may also be used, for example amine oxides or betaines.

The compositions may suitably contain from 10 to 70%, preferably from 15 to 70% by weight, of detergency builder. Preferably, the quantity of builder is in the range of from 15 to 50% by weight.

The detergent composition may contain as builder a crystalline aluminosilicate, preferably an alkali metal aluminosilicate, more preferably a sodium aluminosilicate.

The aluminosilicate may generally be incorporated in amounts of from 10 to 70% by weight (anhydrous basis), preferably from 25 to 50%. Aluminosilicates are materials having the general formula:

where M is a monovalent cation, preferably sodium. These materials contain some bound water and are required to have a calcium ion exchange capacity of at least 50 mg CaO/g. The preferred sodium aluminosilicates contain 1.5–3.5 $SiO_2$ units in the formula above. They can be prepared readily by reaction between sodium silicate and sodium aluminate, as amply described in the literature.

Fabric Softening and/or Conditioner Compounds

If the composition of the present invention is in the form of a fabric conditioner composition, the textile-compatible carrier will be a fabric softening and/or conditioning compound (hereinafter referred to as "fabric softening compound"), which may be a cationic or nonionic compound.

The softening and/or conditioning compounds may be water insoluble quaternary ammonium compounds. The compounds may be present in amounts of up to 8% by weight (based on the total amount of the composition) in which case the compositions are considered dilute, or at levels from 8% to about 50% by weight, in which case the compositions are considered concentrates.

Compositions suitable for delivery during the rinse cycle may also be delivered to the fabric in the tumble dryer if used in a suitable form. Thus, another product form is a composition (for example, a paste) suitable for coating onto, and delivery from, a substrate e.g. a flexible sheet or sponge or a suitable dispenser during a tumble dryer cycle.

Suitable cationic fabric softening compounds are substantially water-insoluble quaternary ammonium materials comprising a single alkyl or alkenyl long chain having an average chain length greater than or equal to $C_{20}$ or, more preferably, compounds comprising a polar head group and two alkyl or alkenyl chains having an average chain length greater than or equal to $C_{14}$. Preferably the fabric softening compounds have two long chain alkyl or alkenyl chains each having an average chain length greater than or equal to $C_{16}$. Most preferably at least 50% of the long chain alkyl or alkenyl groups have a chain length of $C_{18}$ or above. It is preferred if the long chain alkyl or alkenyl groups of the fabric softening compound are predominantly linear.

Quaternary ammonium compounds having two long-chain aliphatic groups, for example, distearyldimethyl ammonium chloride and di(hardened tallow alkyl) dimethyl ammonium chloride, are widely used in commercially available rinse conditioner compositions. Other examples of these cationic compounds are to be found in "Surface-Active Agents and Detergents", Volumes I and II, by Schwartz, Perry and Berch. Any of the conventional types of such compounds may be used in the compositions of the present invention.

The fabric softening compounds are preferably compounds that provide excellent softening, and are characterised by a chain melting Lβ to Lα transition temperature greater than 25° C., preferably greater than 35° C., most preferably greater than 45° C. This Lβ to Lα transition can be measured by DSC as defined in "Handbook of Lipid Bilayers", D Marsh, CRC Press, Boca Raton, Fla., 1990 (pages 137 and 337).

Substantially water-insoluble fabric softening compounds are defined as fabric softening compounds having a solubility of 25 less than $1 \times 10^{-3}$ wt % in demineralised water at 20° C. Preferably the fabric softening compounds have a solubility of less than $1 \times 10^{-4}$ wt %, more preferably less than $1 \times 10^{-8}$ to $1 \times 10^{-6}$ wt %.

Especially preferred are cationic fabric softening compounds that are water-insoluble quaternary ammonium materials having two $C_{12-22}$ alkyl or alkenyl groups connected to the molecule via at least one ester link, preferably two ester links. An especially preferred ester-linked quaternary ammonium material can be represented by the formula (VIII):

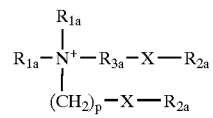

(VIII)

wherein each $R_{1a}$ group is independently selected from $C_{1-4}$ alkyl or hydroxyalkyl groups or $C_{2-4}$ alkenyl groups; each $R_{2a}$ group is independently selected from $C_{8-28}$ alkyl or alkenyl groups; and wherein $R_{3a}$ is a linear or branched alkylene group of 1 to 5 carbon atoms, X is

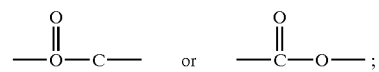

and p is 0 or is an integer from 1 to 5.

Di(tallowoxyloxyethyl) dimethyl ammonium chloride and/or its hardened tallow analogue is especially preferred of the compounds of formula (VIII).

A second preferred type of quaternary ammonium material can be represented by the formula (IX):

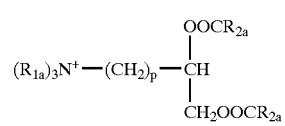

(IX)

wherein $R_{1a}$, p and $R_{2a}$ are as defined above.

It is advantageous if the quaternary ammonium material is biologically biodegradable.

Preferred materials of this class such as 1,2-bis(hardened tallowoyloxy)-3-trimethylammonium propane chloride and their methods of preparation are, for example, described in U.S. Pat. No. 4,137,180 (Lever Brothers Co). Preferably these materials comprise small amounts of the corresponding monoester as described in U.S. Pat. No. 4,137,180, for example, 1-hardened tallowoyloxy-2-hydroxy-3-trimethylammonium propane chloride.

Other useful cationic softening agents are alkyl pyridinium salts and substituted imidazoline species. Also useful are primary, secondary and tertiary amines and the condensation products of fatty acids with alkylpolyamines.

The compositions may alternatively or additionally contain water-soluble cationic fabric softeners, as described in GB 2 039 556B (Unilever).

The compositions may alternatively or additionally contain the polyol polyester (eg, sucrose polyester) compounds described in WO 98/16538.

The compositions may comprise a cationic fabric softening compound and an oil, for example as disclosed in EP-A-0829531.

The compositions may alternatively or additionally contain nonionic fabric softening agents such as lanolin and derivatives thereof.

Lecithins are also suitable softening compounds.

Nonionic softeners include Lβ phase forming sugar esters (as described in M Hato et al Langmuir 12, 1659, 1666, (1996)) and related materials such as glycerol monostearate or sorbitan esters. Often these materials are used in conjunction with cationic materials to assist deposition (see, for example, GB 2 202 244). Silicones are used in a similar way as a co-softener with a cationic softener in rinse treatments (see, for example, GB 1 549 180).

The compositions may also suitably contain a nonionic stabilising agent. Suitable nonionic stabilising agents are linear $C_8$ to $C_{22}$ alcohols alkoxylated with 10 to 20 moles of alkylene oxide, C10 to $C_{20}$ alcohols, or mixtures thereof.

Advantageously the nonionic stabilising agent is a linear $C_8$ to $C_{22}$ alcohol alkoxylated with 10 to 20 moles of alkylene oxide. Preferably, the level of nonionic stabiliser is within the range from 0.1 to 10% by weight, more preferably from 0.5 to 5% by weight, most preferably from 1 to 4% by weight. The mole ratio of the quaternary ammonium compound and/or other cationic softening agent to the nonionic stabilising agent is suitably within the range from 40:1 to about 1:1, preferably within the range from 18:1 to about 3:1.

The composition can also contain fatty acids, for example $C_8$ to $C_{24}$ alkyl or alkenyl monocarboxylic acids or polymers thereof. Preferably saturated fatty acids are used, in particular, hardened tallow $C_{16}$ to $C_{18}$ fatty acids.

Preferably the fatty acid is non-saponified, more preferably the fatty acid is free, for example oleic acid, lauric acid or tallow fatty acid. The level of fatty acid material is preferably more than 0.1% by weight, more preferably more than 0.2% by weight. Concentrated compositions may comprise from 0.5 to 20% by weight of fatty acid, more preferably 1% to 10% by weight. The weight ratio of quaternary ammonium material or other cationic softening agent to fatty acid material is preferably from 10:1 to 1:10.

The fabric conditioning compositions may include silicones, such as predominately linear polydialkylsiloxanes, e.g. polydimethylsiloxanes or aminosilicones containing amine-functionalised side chains; soil release polymers such as block copolymers of polyethylene oxide and terephthalate; amphoteric surfactants; smectite type inorganic clays; zwitterionic quaternary ammonium compounds; and nonionic surfactants.

The fabric conditioning compositions may be in the form of emulsions or emulsion precursors thereof.

Other optional ingredients include emulsifiers, electrolytes (for example, sodium chloride or calcium chloride) preferably in the range from 0.01 to 5% by weight, pH buffering agents, and perfumes (preferably from 0.1 to 5% by weight).

Further Optional Ingredients

Further optional ingredients in the compositions of the invention include non-aqueous solvents, perfume carriers, fluorescers, colourants, hydrotropes, antifoaming agents, antiredeposition agents, enzymes, optical brightening agents, opacifiers, dye transfer inhibitors, anti-shrinking agents, anti-wrinkle agents, anti-spotting agents, germicides, fungicides, anti-oxidants, UV absorbers (sunscreens), heavy metal sequestrants, chlorine scavengers, dye fixatives, anti-corrosion agents, drape imparting agents, antistatic agents, ironing aids, bleach systems, soil release agents and unmodified smectite clays. This list is not intended to be exhaustive.

The compositions of the invention may also include an agent which produces a pearlescent appearance, e.g. an organic pearlising compound such as ethylene glycol distearate, or inorganic pearlising pigments such as microfine mica or titanium dioxide ($TiO_2$) coated mica.

An anti-settling agent may be included in the compositions of the invention. The anti-settling agent, which reduces the tendency of solid particles to separate out from the remainder of a liquid composition, is preferably used in an amount of from 0.5 to 5% by weight of the composition. Organophilic quaternised ammonium-clay compounds and fumed silicas are examples of suitable anti-settling agents.

A further optional ingredient in the compositions of the invention is a flocculating agent which may act as a delivery aid to enhance deposition of the active ingredients (such as the water insoluble particles) onto fabric. Flocculating agents may be present in the compositions of the invention in amounts of up to 10% by weight, based on the weight of the organoclay. Suitable flocculating agents include polymers, for example long chain polymers and copolymers comprising repeating units derived from monomers such as ethylene oxide, acrylamide, acrylic acid, dimethylaminoethyl methacrylate, vinyl alcohol, vinyl pyrrolidone, ethylene imine and mixtures thereof. Gums such as guar gum, optionally modified, are also suitable for use as flocculating agents.

Other possible delivery aids for the particles include, for example, the water-soluble or water-dispersible rebuild agents (eg, cellulose monoacetate) described in WO 00/18860.

Fabric Treatment Products

The composition of the invention may be in the form of a liquid, solid (e.g. powder or tablet), a gel or paste, spray, stick or a foam or mousse. Examples including a soaking product, a rinse treatment (e.g. conditioner or finisher) or a mainwash product. The composition may also be applied to a substrate e.g. a flexible sheet or used in a dispenser which can be used in the wash cycle, rinse cycle or during the dryer cycle.

The compositions may include adjunct components imparting other beneficial properties to the products e.g. lubricants, such as silicones, anti-wrinkling agents, such as lithium salts, and perfume ingredients, such as cyclodextrins and fragrances.

The invention will now be described by way of example only and with reference to the following non-limiting examples. In the examples and throughout this specification all percentages are percentages by weight unless indicated otherwise.

In the following Examples assessment of fabric softeners and the lubrication effect of the clay additives was assessed by Kawabata shear as disclosed, for example, in Melliard Testilbericht 67 (1986) pp 509–516. Samples were tested using a Kawabata KES-FBI machine, Kato Tech Corporation Ltd. Japan. In this machine samples are laced between two clamps which are movable relative to each other.

For each test, six replicas (20 cm square) were used.

After treatment(s) samples were dried and ironed flat.

Samples left to condition for 24 hours prior to testing. All testing was conducted in a test room at 65% r.h. and 20° C.

The specimen is subjected to cyclic shear deformation, the maximum displacement (shear angle) being 8°.

Shear stiffness is highly correlated with the tightness of fabric construction and the inter-yarn friction at yarn/yarn contacts. Shear hysteresis is directly related to the size of the frictional forces operating between yarns and is highly correlated with perceived softness in some fabric constructions. From the shear hysteresis loop, the following parameters are obtained.

G: fabric stiffness in shear. Slope of the hysteresis curve between 0.5° and 2.5° shear angle—an average of positive and negative regions of the curve is taken.

2HG: width of the hysteresis loop at 0.5° shear angle— average of values measured at 0.5° and −0.5° is taken.

2HG5: width of the hysteresis loop at 5° shear angle—average of values measured at 50 and −5° is taken.

Comparative softeners/lubrication effect was assessed by shear hysteresis at 50 shear angle (2HG5). A decrease in shear hysteresis reflects increased softness/lubrication performance.

EXAMPLES 1–5

Standard Synthesis of Magnesium (Organo) Phyllosilicates

Examples 1 to 5 employed a direct one-step approach, in which products were precipitated from basic alcoholic solutions. Typically, magnesium chloride hexahydrate, $MgCl_2.6H_2O$ was charged to a reaction vessel and ethanol/methanol was added. Stirring was employed to dissolve the magnesium salt. Organotrialkoxysilane was added, under rapid stirring, followed immediately by the addition of sodium hydroxide solution (0.05 M). The resultant reaction mixture was stirred at room temperature for a minimum of 1 hour. The product of the reaction was isolated by filtration or centrifugation and washed with copious water and ethanol. The products may be retained as a slurry in water, dried in air or with or without heating, dried under vacuum with or without heating or freeze-dried.

The amount of organotrialkoxysilane added in each case was equal to the stoichiometric amount required to synthesise materials with Si/Mg=1.33. Molar ratios of approx. Si:Mg:OH=1:0.75:0.90 were employed in the synthesis.

The following starting precursors were used in Examples 1 to 5:

| Example | Organotrialkoxysilane Precursor |
|---|---|
| 1 | Octadecyldimethyl (3-trimethoxysilylpropyl) ammonium chloride |
| 2 | Hexyltriethoxysilane |
| 3 | Octyltriethoxysilane |
| 4 | Dodecyltriethoxysilane |
| 5 | (3-Glycidoxypropyl) trimethoxysilane |

Example 5 is not a material for use in fabric treatment in accordance with the invention but is an example of a clay having a functional group which can be used in a reaction to introduce functional groups in accordance with the invention.

EXAMPLES 6 to 8

Alcoholic, Base-Free Synthesis of Magnesium Amino-Containing (Organo)Phyllosilicates Examples 6 to 8 employed an alternative method for preparation of amino-containing magnesium organoclays employed base-free, alcoholic conditions. Magnesium chloride hexahydrate, $MgCl_2.6H_2O$, was dissolved in ethanol or methanol and organotrialkoxysilane was added with rapid stirring. Immediate clouding of the solution followed by copious precipitation ensued after 5 minutes stirring. The reaction mixture was left stirring at room temperature for a minimum of 1 hour. The product of reaction was isolated by filtration and washed thoroughly with ethanol. The products of the reaction may be redispersed in ethanol or water and retained as a slurry, dried in air with or without heating, dried under vacuum with or without heating or freeze-dried.

The amount of organotrialkoxysilane added in each case was equal to the stoichiometric amount required to synthesise materials with Si/Mg=1.33.

The following starting precursors were used in Examples 6 to 8:

| Example | Organotrialkoxysilane Precursor |
|---|---|
| 6 | 3-Aminobutyltriethoxysilane |
| 7 | 4-Aminobutyltriethoxysilane |
| 8 | N-Trimethoxysilylpropyl-N, N, N-trimethylammonium chloride |

EXAMPLES 9 to 16

The utility of the pendant epoxide group 3-glycidoxypropyl on the clay of Example 5 (epoxide clay) to post-functionalisation by nucleophiles was utilised to introduce alternative functional groups.

EXAMPLE 9

The epoxide group was initially ring-opened by heating with an excess of ethylenediamine to give an amine-terminated clay. After continuous extraction with acetone the dried clay contained nitrogen by elemental analysis. The prepared amino clay was then reacted with succinic anhydride to give a clay with an acid functionality, the FTIR of the clay showed evidence of an amide and carboxylicacid carbonyl stretch.

EXAMPLES 11 to 12

The functionalisation of the epoxide clay with amino-terminal polyethyleneglycols (Jeffamines) was analogous to the reaction of the clay with ethylenediamine, whereby the clays were heated with an excess solution of the oligomeric amines and exhaustively extracted after functionalisation. The covalent attachment of the oligomers was shown by the presence of nitrogen in the elemental analysis. In total three Jeffamine variants were reacted; two α, ω-diamines with molecular weights of 2,000 (Example 10) and 3,000 (Example 11) and a mono amine with a molecular weight of 1,000 (Example 12).

EXAMPLES 13 to 16

Polydimethylsiloxane (PDMS)-functionalised clays were prepared via the reaction of the epoxide clays with α, ω-diamino PDMS (900, 2000 and 3,000 mwts) (Examples 13 to 15) and α, ω-dihydroxy PDMS oligomers. (Example 16). In the case of the diamine simply heating the epoxide clay with the diamine was sufficient to ring-open the epoxide while the diol required the use of 1 equivalent of sodium hydride to form the more nucleophilic alkoxide.

EXAMPLE 17

Synthesis of clay having the functional group —$C_3$(PEG)$_{6-9}$OCH$_3$. Magnesium chloride hexahydrate was charged to a reaction vessel and ethanol or methanol was added. Stirring was employed to dissolve the magnesium salt. The organotrialkoxysilane, 2-[method(polyethyleneoxy)propyl]trimethoxysilane, was added under rapid stirring, followed immediately by the addition of sodium hydroxide solution (0.05M). The reaction mixture was stirred at room temperature for a minimum of one hour. Ethanol and methanol were removed from the reaction mixture by rotary evaporation and the resultant mixture was freeze-dried.

The amount of organtrialkoxysilane added in the experiment was equal to the stoichiometric amount required to synthesise materials with Si/Mg=1.33. Molar ratios of approx. Si:Mg:OH=1:0.75:0.90 were employed in the synthesis.

EXAMPLE 18

Synthesis of a Mixed Functional Group Clay

Magnesium chloride hexahydrate was charged to a reaction vessel and stirred to dissolution. Two organotrialkoxysilanes were added under rapid stirring, followed immediately by the addition of sodium hydroxide solution (0.05M). The resultant reaction mixture was stirred at room temperature for a minimum of one hour. The product of the reaction was isolated by filtration and washing with ethanol. The solid product was dried at room temperature.

A 50:50 stoichiometric mix of 2-[methoxy (polyethyleneoxy) propyl]trimethoxysilane and octadecyldimethyl (3-trimethoxysilylpropyl)ammonium chloride was used in amounts equal to an overall Si/Mg=1.33 Molar ratios of approx. Si:Mg:OH=1:0.75:0.90 were employed in the synthesis.

EXAMPLE 19

Delivery of Functionalised Clay from a Liquid Detergent Composition

The following detergent composition was used:

| | |
|---|---|
| Anionic surfactants | 20% |
| (Sodium benzylsulfonate + sodium alcohol EO sulfate) | |
| Nonionic surfactant (Alkyl ethoxylate) | 5% |
| Sodium citrate | 4% |

Minor ingredients: enzymes, enzyme stabilizing systems, fluorescer, perfumes, water etc to make up to 100%

Washing Procedure

The following wash conditions were employed:

| | |
|---|---|
| Product | Fabric washing liquid formulation (A) 1.69 g/litre |
| Functionalised clay | 0, 2.5, 5 and 10% by weight of formulation (A) |
| Fabric | Two swatches of Oxford cotton measuring 40 × 40 cm cut into 20 × 20 cm squares, total fabric weight 40 g, the warp direction was marked on each piece with an indelible pen. |
| Liquor | 950 ml of demineralised water and 50 ml of demineralised water containing the required level of functionalised clay, overall liquor to cloth ratio 25:1 |
| Apparatus | Tergotometer set at 75 rpm |
| Wash time | 15 minutes |
| Wash temperature | 35° C. |
| After wash | Fabrics removed, squeezed to remove excess water, and allowed to drain |
| Rinse | 1 litre of demineralised water, liquor to cloth ratio 25:1, 5 minute rinse |
| Rinse temperature | 25° C. |

| | |
|---|---|
| Spin cycle | Each set of fabric swatches was spun individually (to avoid cross contamination) in a spin dryer for 30 seconds. |
| Tumble dry | Each set of fabric swatches was dried individually on normal setting |

Evaluation

The Oxford cotton pieces were conditioned for 24 hours at 20° C. and 65% RH. The shear hysteresis (2HG5) of 6 fabric pieces was measured in the centre of each piece in the warp direction. The average 2HG5 and the standard deviation were calculated for each treatment. Treatments can only be compared within the experiment.

| | Test | | | | |
|---|---|---|---|---|---|
| | 1 | 2 | 3 | 4 | 5 |
| | Clay of | Clay of | Clay of | Clay of | Clay of |
| | Example 1 | Example 8 | Example 4 | Example 3 | Example 6 |
| Additives | 2HG5 | 2HG5 | 2HG5 | 2HG5 | 2HG5 |
| Fabric washing liquid formulation (A) | 5.64 | 6.4 | 5.78 | 6.49 | 6.39 |
| Formulation (A) + additive 2.5% | 5.43 | 5.81 | 5.75 | 6.01 | 6.4 |
| Formulation (A) + additive 5% | 5.16 | 5.89 | 5.76 | 6.16 | 5.9 |
| Formulation (A) + additive 10% | 5.27 | 6.16 | 5.05 | 6.02 | 5.87 |

The results clearly demonstrate a reduction in 2HG5 when additives of the invention are included in the detergent composition.

EXAMPLE 20

Performance of functionalised clays in main wash and rinse application.

A simulated wash experiment was carried out. 200 ml local town's supply water heated to 40° C. Four (20×20 cm) unresinated cotton poplin squares (20 g) added to the Linitest pot. Washing (with agitation) ensued for 30 minutes. Fabrics were subjected to two cold water rinses for 5 minutes each rinse. Fabrics were tumble dried, trimmed to 17×17 cm and conditioned for several hours in a humidity-controlled room.

The following detergent and fabric conditioning compositions were used:

Formulation B: Test Wash Detergent Composition (Granular Detergent)

| | Weight % |
|---|---|
| Na-LAS | 10 |
| Nonionics 7EO + 3EO | 6 |
| Zeolite A4 | 35 |
| Soda ash | 7 |

Made up to 100% with water

Formulation C: Fabric Conditioning Formulation: Test Conditioning Formulation

| | Weight % |
|---|---|
| HEQ* | 11 |
| Coco 20EO | 1 |
| Tallow fatty acid | 1 |
| Minor ingredients: perfume, stabilisers | <5 |

Deionized water to make up to 100%
*(hardened tallowoyloxy) trimethylammonium propane chloride The following tests were conducted:

6. 1.0 g Formulation B+7% smectite clay (QPC 200 g) in formulation applied in main wash.
7. 1.0 g Formulation B added along with 7% functionalised clay of Example 1 in formulation.
8. 1.0 g Formulation B added at start of wash. 0.5 mL formulation C applied in final rinse to give theoretical maximum active levels of 0.3% on weight of fabric.
9. 1.0 g Formulation B added at start of wash. 0.06 g functionalised clay of Example 1 added in final rinse Experimental Summary

| Test | Main wash Granulated powder composition | Additive (% in formulation) | Final rinse Ingredient (% max on weight of fabric) | Shear hysteresis, 2HG5 |
|---|---|---|---|---|
| 6 | Formulation (B) | QPC200G (7%) | — | 7.6 |
| 7 | Formulation (B) | Clay of Example 1 (7%) | — | 7.1 |
| 8 | Formulation (B) | — | Formulation (C) (0.3%) | 6.4 |
| 9 | Formulation B | — | Clay of Example 1 (0.3%) | 6.0 |

Tests 6 and 7 compare the performance between unmodified smectite clay against the clay of Example 1 in main wash. Tests 8 and 9 compare the performance between a standard fabric conditioner and the clay of Example 1 in the rinse at approximately equivalent active levels.

In each case the presence of the clay in accordance with the invention provides a significant improvement.

EXAMPLE 21

Performance of Functionalised Clay Delivered from a Fabric Washing Liquid Formulation Washing Procedure Wash Loads:

20 Oxford pinpoint cotton 40×40 cm monitors (ex. Textile Innovators -TIC 410) and 20 poplin unresinated cotton 40×40 cm monitors (ex. Phoenix Calico) ballast used to make the load weight to 2.7 kg (100×100 cm woven cotton pieces)

Wash Conditions:

32° C. wash (12 mins), 6° F.H 'US' water, 65 litres per wash (US Whirlpool machine)

4 loads per treatment; fresh monitors and ballast used for each wash.

each load tumble dried after every wash for 60 mins (US Whirlpool electric dryer, permanent press/heavy setting)

loads were removed immediately after the tumble dryer stopped

Treatments:
Formulation A of Example 19 (110 g)
Formulation A (100 g)+Clay of Example 1 (10 g)
Formulation A (100 g)+smectite clay (Gelwhite GP) (10 g)

Evaluation:

Wrinkle assessments were made after single washes for each formulation on both poplin and Oxford cotton fabric constructions.

Monitors were panelled against an in-house wrinkle scale ranging from 0–10; where 0 is zero wrinkling and 10 is heavy wrinkling.

A selection of washed Oxford and poplin monitors were also measured using Kawabata shear (a measure of lubrication).

Results

| | Average Wrinkle scores (0–10 wrinkle scale) | | Average Kawabata scores (2HG5) | |
|---|---|---|---|---|
| | Oxford | Poplin | Oxford | Poplin |
| Formulation A | 6.0 | 4.1 | 6.9 | 5.8 |
| Formulation A + Gelwhite clay | 5.9 | 3.9 | 6.6 | 5.7 |
| Formulation A + Clay of Example 1 | 5.3 | 2.6 | 5.4 | 5.3 |

Wrinkle Scores:

The difference between the results for Formulation A and Formulation A+functionalised clay of the invention when averaged over all single wash tests was approximately 0.7 units on the 0–10 scale on Oxford cotton monitors and 1.5 scale units on poplin cotton monitors. Thus, these results clearly demonstrate a reduction in wrinkling when a functionalised clay of the invention is included in the detergent composition.

Kawabata Scores:

Results from Kawabata measurements carried out on monitors following a single wash illustrate the increased level of lubrication delivered to fabrics when a fuctionalised clay of the invention is included in the detergent composition.

The invention claimed is:

1. Fabric treatment composition comprising a textile compatible carrier and particles having a layered structure comprising oxygen atoms and silicon and/or phosphorus atoms, and comprising organic functional groups which are bonded to silicon and/or phosphorus atoms in the layers by direct covalent bonds between the silicon and/or phosphorus atoms and a carbon atom, characterised in that the functional groups are selected from:

(i) a group of the formula:

$$-Y-T \quad (I)$$

in which:

Y comprises a chain of at least 6 carbon atoms optionally interrupted by one or more heteroatoms selected from N, O and S providing there are at least 3, preferably at least 4 carbon atoms for each heteroatom in the chain, Y being linked to said silicon or phosphorous atom through a carbon atom, and T represents H or a terminal group which is not capable of self-cross-linking and/or forming covalent bonds to cellulosic and/or proteinaceous fibres during domestic washing and rinsing cycles;

(ii) a group of the formula:

$$-R^1-NR^2R^2 \quad (II)$$

in which:

$R^1$ represents an alkylene group of at least 4 carbon atoms, each $R^2$ is independently lower alkyl and $-NR^2R^2$ is preferably, but need not be, a terminal group;

(iii) a group of the formula:

$$-R^3-\overset{+}{N}R^4R^4R^4 \quad (III)$$

in which:

$R^3$ represents an alkylene group of at least 3 carbon atoms, each $R^4$ is independently selected from alkyl groups of from 1 to 25 carbon atoms provided at least one $R^4$ is lower alkyl of 1 to 16 carbon atoms, (iv) a group of the formula $$\begin{array}{c} R_{1a} \\ | \\ R_{1a}-N^+-R_{3a}-X-R_{2a} \\ | \\ (CH_2)_p-X-R_{2a} \end{array} \quad (IV)$$

in which each $R_{1a}$ group is independently selected from $C_{1-4}$ alkyl or hydroxyalkyl groups or $C_{2-4}$ alkenyl groups;

each $R_{2a}$ group is independently selected from $C_{8-28}$ alkyl or alkenyl groups;

$R_{3a}$ is a linear or branched alkylene group of 1 to 5 carbon atoms,

X is $$\begin{array}{cc} O & O \\ \| & \| \\ -O-C- & \text{or} \quad -C-O-; \end{array}$$

and p is 0 or is an integer from 1 to 5, with the proviso that one of $R_{1a}$ and $R_{2a}$ is an alkylene group of at least 3 carbon atoms attached to said silicon or phosphorus atom;

(v) a group of the formula:

$$(R_{1a})_3N^+-(CH_2)_p-\overset{OOCR_{2a}}{\underset{CH_2OOCR_{2a}}{CH}} \quad (V)$$

in which $R_{1a}$, p and $R_{2a}$ are as defined above;

(vi) a group of the formula:

$$-R^5{\overset{\frown}{\phantom{aa}}\overset{\frown}{\phantom{aa}}O}_n T \quad (VI)$$

in which:

T is as defined above, $R^5$ represents a group of at least one carbon atom, preferably at least 3 carbon atoms, which may be interrupted by one or more heteroatoms selected from N, O and S providing there are at least 3 carbon atoms for each heteroatom, n is an integer of at least 6; and (vii) a group of the formula:

$$-R^5{\left(\begin{array}{c} R^6 \\ | \\ Si-O \\ | \\ R^6 \end{array}\right)}_x T \quad (VII)$$

in which:

T and $R^5$ are as defined above, each $R^6$ independently represents an alkyl group, a fluorinated alkyl group, an amino substituted alkyl group, an alkyl group substituted with a sugar moiety, or a sidechain comprising an ethoxylated and/or propoxylated chain, and x is an integer of at least 5.

2. A composition as claimed in claim 1 in which —Y-T is an alkyl group of from 6 to 20 carbon atoms.

3. A composition as claimed in claim 1 in which each $R^2$ is lower alkyl of from 1 to 6 carbon atoms.

4. A composition as claimed in claim 1 in which at least one of $R^2$ is an alkyl group of at least 8 carbon atoms.

5. A composition as claimed in claim 4 in which each $R^2$ is an alkyl group of at least 8 carbon atoms.

6. A composition as claimed in claim 1 in which T is selected from hydrogen, alkyl, ether, carboxylic acid, $SO_3$ and $SO_4$ groups, phosphate and phosphonate.

7. A composition as claimed in claim 1 in which the particles comprise two or more different functional groups selected from formulas (I) to (VII).

8. A composition as claimed in claim 1 wherein the particles comprise layers which further comprise atoms selected from magnesium, aluminiun, nickel, zirconium and mixtures thereof.

9. A composition as claimed in claim 1 wherein the particles are of a clay in which the organic functional groups have been introduced during formation of the clay.

10. A composition as claimed in claim 1 wherein the particles are of an organophyllosilicate.

11. A composition as claimed in claim 1 which is a main wash detergent composition and wherein the textile compatible carrier comprises a detergent active compound.

12. A composition as claimed in claim 1 which is a fabric conditioner comprising one or more fabric softening or conditioning agents.

13. A composition as claimed in claim 1 comprising one or more further components selected from builders and enzymes.

14. A composition as claimed in claim 1 comprising from 0.01% to 50% by weight of the particles.

15. A composition as claimed in claim 14 comprising from 0.1% to 20% by weight of the particles.

16. A method of treating a fabric comprising contacting a fabric with the fabric treatment particles as defined in claim 1.

17. A method of treating a fabric to provide enhanced lubricating properties to the fabric comprising contacting a fabric with the fabric treatment particles as defined in claim 1.

18. A method of treating a fabric to decrease the Kawabata shear of the fabric measured according to the Kawabata Shear Test defined herein, comprising contacting a fabric with the fabric treatment particles as defined in claim 1.

19. A method of treating a fabric to provide improved softness and/or ease of ironing and/or anti-wrinkle properties and/or anti-abrasion properties, comprising contacting a fabric with the fabric treatment particles as defined in claim 1.

20. A method of treating a fabric comprising contacting a fabric with the fabric treatment composition as defined in claim 1.

21. A method of treating a fabric to provide enhanced lubricating properties to the fabric comprising contacting a fabric with the fabric treatment composition as defined in claim 1.

22. A method of treating a fabric to decrease the Kawabata shear of the fabric measured according to the Kawabata Shear Test defined herein, comprising contacting a fabric with the fabric treatment composition as defined in claim 1.

23. A method of treating a fabric to provide improved softness and/or ease of ironing and/or anti-wrinkle properties and/or anti-abrasion properties, comprising contacting a fabric with the fabric treatment composition as defined in claim 1.

24. The method of claim 16 in which the treatment is part of a domestic laundering process.

* * * * *

UNITED STATES PATENT AND TRADEMARK OFFICE
CERTIFICATE OF CORRECTION

PATENT NO.       : 7,012,055 B2
APPLICATION NO.  : 10/406952
DATED            : March 14, 2006
INVENTOR(S)      : Findlay et al.

It is certified that error appears in the above-identified patent and that said Letters Patent is hereby corrected as shown below:

Column 21, line 60, please change:

X is

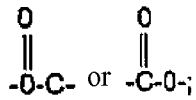

to:

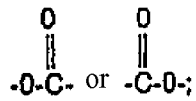

Column 4, line 60, please change:

X is

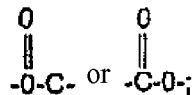

to:

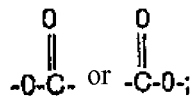

Signed and Sealed this

Second Day of October, 2007

JON W. DUDAS
*Director of the United States Patent and Trademark Office*